United States Patent
Lim et al.

(10) Patent No.: US 7,352,934 B2
(45) Date of Patent: Apr. 1, 2008

(54) THREE DIMENSIONAL HIGH INDEX OPTICAL WAVEGUIDES BENDS AND SPLITTERS

(75) Inventors: Desmond R. Lim, Cambridge, MA (US); Christina Manolatou, Cambridge, MA (US); Paul Maki, Harvard, MA (US); Kevin K. Lee, Cambridge, MA (US); Kazumi Wada, Lexington, MA (US); Hermann A. Haus, Lexington, MA (US); Lionel C. Kimerling, Concord, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 425 days.

(21) Appl. No.: 09/996,462

(22) Filed: Nov. 28, 2001

(65) Prior Publication Data

US 2002/0141704 A1    Oct. 3, 2002

Related U.S. Application Data

(60) Provisional application No. 60/253,604, filed on Nov. 28, 2000.

(51) Int. Cl.
*G02B 6/26* (2006.01)
(52) U.S. Cl. ............................. 385/44; 385/45; 385/47
(58) Field of Classification Search ............. 385/44–48
See application file for complete search history.

(56) References Cited

U.S. PATENT DOCUMENTS 5,239,600 A * 8/1993 Handa et al. ................. 385/48
5,814,416 A * 9/1998 Dodabalapur et al. ...... 428/690
5,949,931 A * 9/1999 Kitamura ..................... 385/28
6,542,671 B1 * 4/2003 Ma et al. ...................... 385/47

FOREIGN PATENT DOCUMENTS

| FR | 2 703 473 | 3/1993 |
|----|-----------|--------|
| JP | 04067120  | 3/1992 |
| JP | 05175612  | 7/1993 |
| JP | 2000171650| 6/2000 |

OTHER PUBLICATIONS

"High Density Integrated Optics," Manolatou et al. *Journal of Lightwave Technology*, Sep. 1999. vol. 17, No. 9.
"Development of a Library of Low-Loss Silicon-On-Insulator Optoelectronic Devices," Tang et al. *IEEE Proc.-Optoelectron*, Oct. 1996. vol. 143, No. 5.
"Small Radius Bends and Large Angle Splitters in SOI Waveguides," Foresi et al. *SPIE-Massachusetts Institute of Technology*. 1997. vol. 3007.

* cited by examiner

*Primary Examiner*—Tina M. Wong
(74) *Attorney, Agent, or Firm*—Gauthier & Connors LLP

(57) ABSTRACT

An optical cavity structure for bending optical signals is provided. The optical cavity structure includes an input port for receiving input optical signals from a first waveguide. The optical cavity structure also includes an interconnecting structure that receives said input optical signals and interconnects said first waveguide to a second waveguide, the interconnecting structure further includes at least four straight edges that orthogonal and of a finite width. The optical cavity structure further includes an output port coupled to the interconnecting structure for providing the second waveguide with the input optical signals. Further, the optical cavity structure may be used to create three dimensional splitter devices and resonators.

34 Claims, 2 Drawing Sheets

THREE DIMENSIONAL HIGH INDEX OPTICAL WAVEGUIDES BENDS AND SPLITTERS

PRIORITY INFORMATION

This application claims priority from provisional application Ser. No. 60/253,604 filed Nov. 28, 2000.

BACKGROUND OF THE INVENTION

The present invention is in the field of optics, specifically in integrated optics bends, splitters, and resonators. High index contrast waveguides provide high-density integration for optical networking and on-chip optical interconnects. One of the main features of high index contrast waveguides has been the demonstrated ability to manufacture low loss compact bends, splitters and resonators.

It is has been shown that the bending loss for a 1 μm radius of curvature bend in a silicon high index contrast strip waveguide is 0.5 dB/turn. However, this number is still much larger than the theoretically predicted bending loss. Furthermore, a splitting loss of 0.2 dB has been reported with a Y-split angle of 2 degrees. This small split angle results in a rather long, 30 micron, Y-splitter.

To address this problem, the article C. Manotalou et al., "High-Density Integrated Optics", Journal of Lightwave Technology, 1999, vol. 17, no. 9, proposed two dimensional bends and splitters based on a two-dimensional high transmission cavity (HTC) with a polygonal shape. High transmissions cavity bends and splitters were designed with bandwidths exceeding 100 nm and transmission rates greater than 95%.

The two dimensional high transmission cavities (HTCs) are shaped as polygons, with one side at a 45 degree angle to the incoming and outgoing waveguides. A 2-D HTC bend may be formed by adding two waveguides together, thus forming two coupled resonators.

There was a need in the art to provide a way to split incoming optical signals in a waveguide into two separate and distinct signals. Specifically, 2-D HTC Y-splits were important because they accomplished that task of splitting an incoming signal into two separate signals. The geometry of the 2-D Y-split HTC was such that the splitting point was 90 degrees and the splitting area was small. The 2-D Y-splitter HTC did this most efficiently, because the two splitted signals were directed away from each other.

SUMMARY OF THE INVENTION

Accordingly, the invention presents a novel method and system for developing extremely small high index contrast bends, splitters, and resonators using a structure known as a high transmission cavity in three dimensions.

According to one aspect of the present invention, an optical cavity waveguide structure is provided. The optical cavity waveguide structure includes an input port for receiving input optical signals from a first waveguide. The optical cavity waveguide structure also includes an interconnecting structure that receives said input optical signals and interconnects said first waveguide to a second waveguide, the interconnecting structure further includes at least 4 straight edges that are orthogonal and of a finite width. The optical cavity structure further includes an output port coupled to the interconnecting structure for providing the second waveguide with the input optical signals.

According to another aspect of the invention, an optical splitter device is provided. The optical splitter device includes an input port for receiving input optical signals from an input waveguide. The optical splitter further includes a splitting structure that receives the input optical signals and splits the input signals into at least two separate signals that are directed to at least two separate waveguides. The splitting structure also includes at least two separate optical cavities connected to their sides that are orthogonal with a finite width.

According to another aspect of the present invention, an optical resonator is provided. The optical resonator includes a plurality of straight edge waveguides. The optical resonator also includes a plurality of interconnecting elements for interconnecting said plurality of straight waveguides to form said optical resonator, wherein said interconnecting elements include at least four straight edges that are orthogonal and of a finite width.

DETAILED DESCRIPTION OF THE INVENTION

Figure 1:
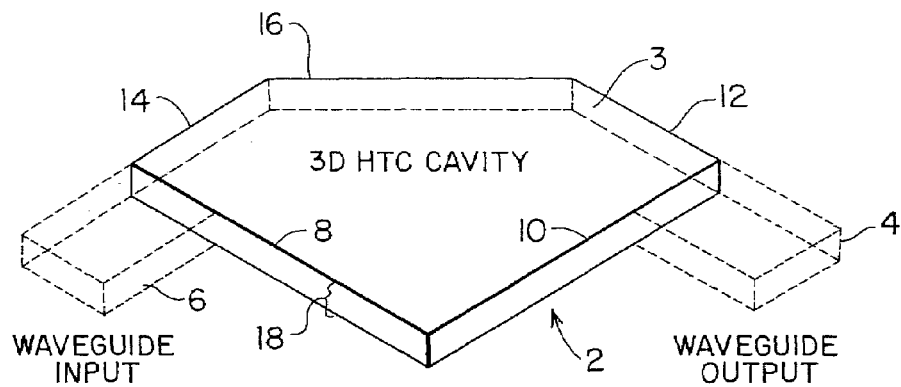
FIG. 1 illustrates a three dimensional (3-D) HTC bend.

FIG. 1 illustrates a 3-D HTC bend design. The 3-D HTC bend 2 includes a two dimensional (2-D) HTC bend 3 that includes a quarter of an octagon with an input waveguide 6 and an output waveguide 4 attached to two of the facets of the resulting five sided sections 8, 10, 12, 14, and 16. The 3-D HTC bend 2 also includes four orthogonal straight edge sides 8, 10, 12, and 14. The fifth side 16 of the 3-D HTC bending structure is aligned at an angle of 135 degrees from both of its adjacent sides 12 and 14. The 2-D HTC bend 3, while useful theoretically, has no 3-D structure and cannot be easily used in integrated optics applications in an obvious way. The use of a 3-D HTC bend 2 is an attempt to extend the 2-D HTC bend 3 to three dimensions by utilizing the same five-sided polygon with a finite thickness 18.

The 3-D HTC bend 2 may be understood in two ways. The first is to look at the 45-degree facet 16 as a reflector. As light enters through the input waveguide 6 it is reflected off the 45-degree facet 16. The inside of the 3-D HTC bend 2 has extra material that acts to pull down the mode away from the outer wall, improving the mode matching of the bending section with respect to the input and output waveguides and 6 and 4, which in turn reduces the loss of the bend. The other way to understand the 3-D HTC bend 2 is to analyze it as a low load Q resonator. The resonator is strongly coupled to the input and output waveguides 6 and 4 resulting in its low load Q and large transmission bandwidth.

The 3-D HTC bend 2 only includes straight edges 8, 10, 12, 14, and 16, and thus, reduces that amount of loss in the structure. For purposes of illustration, the 3-D HTC bend 2 may be used with polySi and SOI (silicon on insulator) waveguides either as an input waveguide 6 or an output waveguide 4. The bending loss associated with a 3-D HTC bend 2 fabricated with polySi is 0.3 db/turn. That is smaller than the loss value obtained for a 1 micron radius of curvature round bend on the same die. These numbers are impressive given that the area up by the 3-D HTC bend 2 is smaller than the area taken up by the round bend. The thickness 18 may be approximately 0.2 μm. In general, the thickness will be chosen to maintain the lowest number of modes.

Figure 2:
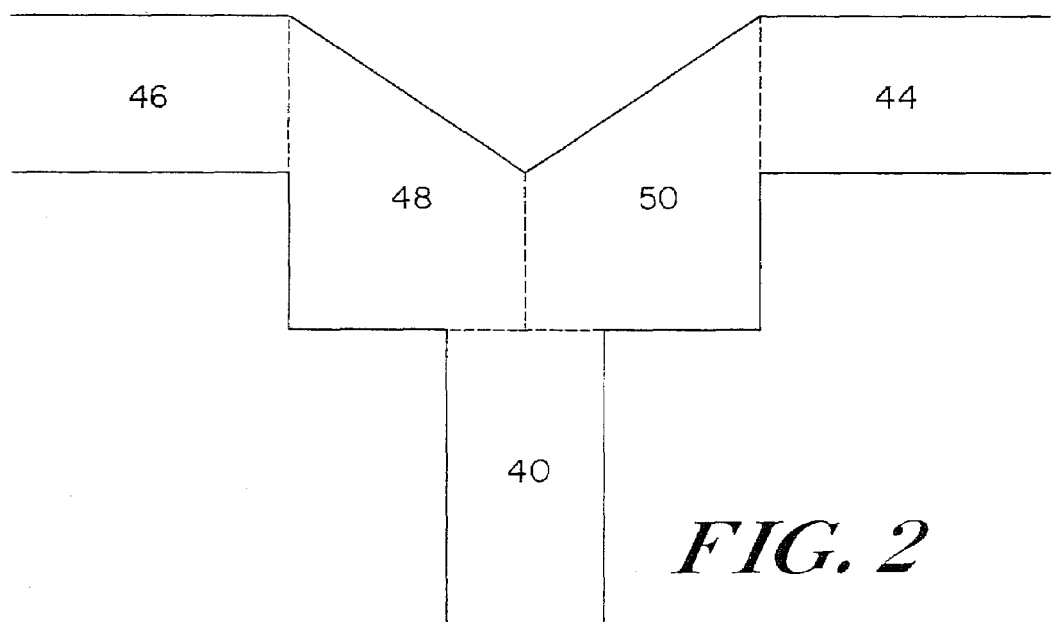
FIG. 2 illustrates a 3-D HTC T-splitter.

FIG. 2 illustrates a 3-D HTC T splitter. The task of the 3-D T-splitter 42 is to split incoming optical signals from the input waveguide 40 into two separate optical signals. These optical signals are then directed to the two output waveguides 44 and 46 of the 3-D HTC T-splitter 42. The aligning together the largest sides of two 3-D HTC bend structures 48 and 50 form the 3-D HTC T-splitter.

One of the main advantages of utilizing the 3-D HTC T-splitter 42 over a traditional Y-splitter is its small size, since a Y-split must incorporate a small split angle and larger bends to maintain its low loss nature. On the other hand, in a T-split structure the input waveguide exits opposite the two output waveguides, reducing the need for bends. The 3-D HTC T-splitter 42 also has a considerable loss advantage when compared to other traditional T-split structures, the latter of which involves the incoming waveguide terminating abruptly into the output waveguides. Another big advantage of the 3-D HTC T-splitter 42 is that it is more tolerant of fabrication errors then a traditional Y-split. Just like the aforementioned 3D-HTC structure, the 3-D HTC T-splitter has a finite thickness For illustrative purposes, the invention utilizes polySi and SOI (silicon on insulator) waveguides as either an input waveguide 40 or output waveguides 44 and 46. The polySi and SOI waveguides have a silicon (n=3.48) core, a bottom cladding of silica (n=1.48) and top cladding of air. The transmission loss of the inventive 3-D HTC T-splitter 42 fabricated in polySi is approximately −1.2 dB, which is large when compared to the −0.15 dB loss extracted for the Y-split fabricated in the same mask. It may be shown that this loss number will improve with a more efficient design. The thickness of the 3-D HTC T-splitter may be 0.2 μm. The thickness is chosen to maintain a low number of modes. The 3-D HTC T-splitter 42 represents the ultimate 90-degree split since they occupy a very small area. The power uniformity of these devices is good due to the inherent symmetry of the device. The benchmark $$\frac{\sigma}{\mu}$$

(standard deviation/mean) to measure deviations in the split ratio, was 0.2, which is significantly better than the traditional Y-splits.

Figure 3:
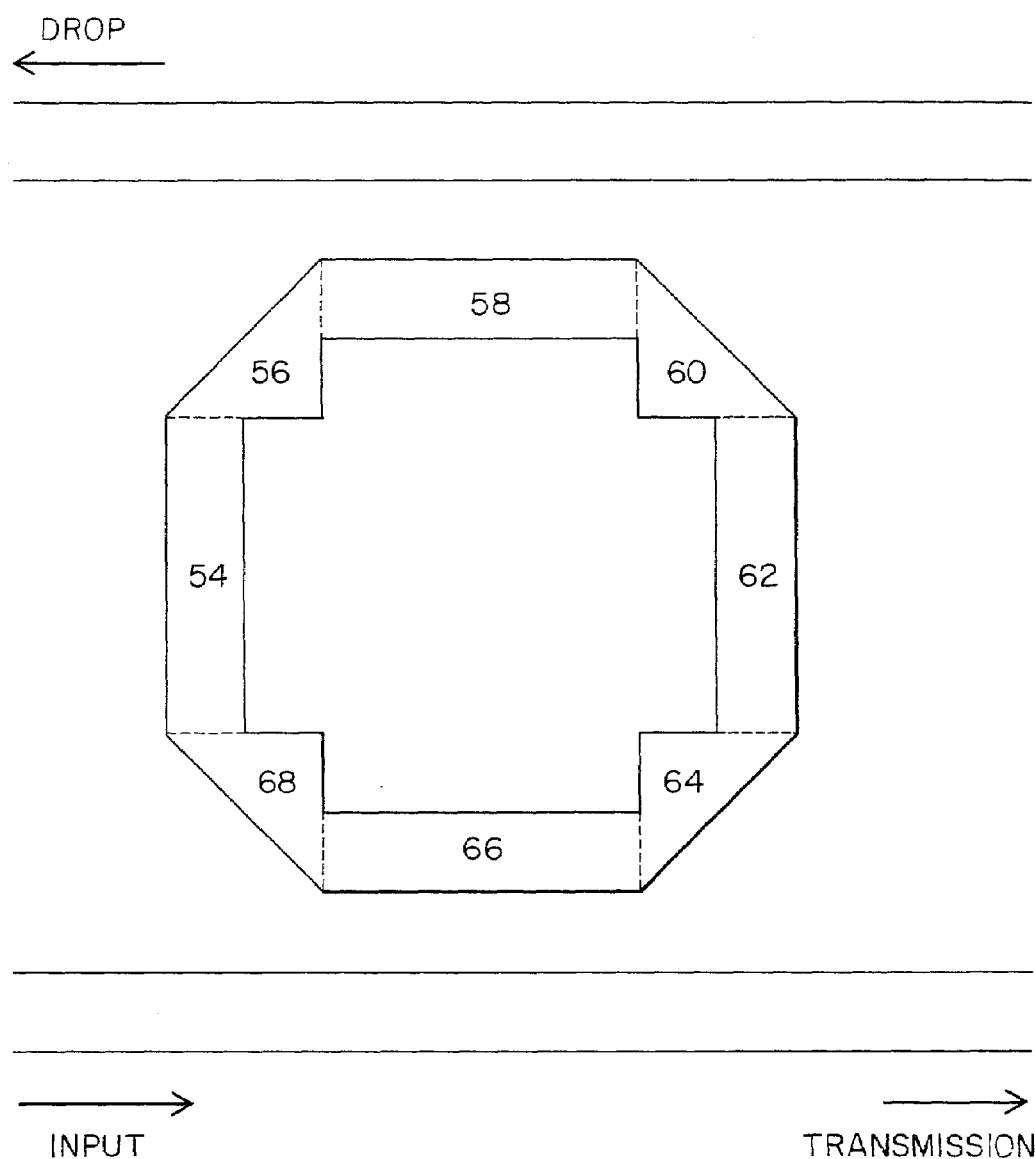
FIG. 3 illustrates HTC resonator structure.

FIG. 3 illustrates an HTC traveling wave resonator. The HTC resonator 52 is a traveling waveguide resonator that includes several straight edge waveguide sections 54, 58, 62, and 66 and an equal number of HTC bends 56, 60, 64, and 68 to connect the sections 54, 58, 62, and 66. The HTC resonator 52 may be formed with more waveguide sections and 3-D HTC bends. However, the HTC resonator 52 is most efficient when there are equal numbers of straight edge waveguide sections and 3-D HTC bends. Also, this resonator can be used to measure the loss associated with HTC bends and as a method for making traveling waveguides with anisotropic etchants.

For illustrative purposes, the HTC traveling wave resonator 52 is implemented in polySi and SOI materials utilizing the same aforementioned HTC bend discussed above. The 3-D HTC bends 56, 60, 64, and 68 interconnect the waveguide sections 54, 58, 62, and 66 in a closed loop formation. The HTC wave resonator is much easier to fabricate than other standard resonators. As mentioned above, the fabrication of the 3-D HTC bends 56, 60, 64, and 68 do not require an extensive amount of fabrication, and the waveguide sections can be any standard straight edge waveguides. The measured Q for such an arrangement 52 is 750 and loss of the HTC bends 56, 60, 64, and 68 was extracted to be 0.2 dB/turn, which is consistent with the number discussed above. Thus, the HTC traveling wave resonator 52 is an efficient resonator.

Although the present invention has been shown and described with respect to several preferred embodiments thereof, various changes, omissions and additions to the form and detail thereof, may be made therein, without departing from the spirit and scope of the invention.

What is claimed is:

1. An optical cavity structure, comprising:
   an input port for receiving input optical signals from a first waveguide;
   a three dimensional high transmission cavity structure that receives said input optical signals and interconnects said first waveguide to a second waveguide, said three dimensional high transmission cavity structure includes at least four straight edges that are orthogonal and of a finite width and thickness, said three dimensional high transmission cavity structure comprising at least one two dimensional high transmission cavity bend structure and having materials that act to pull down a mode away from the outer wall, improving mode matching and reducing loss; and
   an output port coupled to said three dimensional high transmission cavity structure for providing said second waveguide with said input optical signals.

2. The optical cavity structure of claim 1, wherein the three dimensional high transmission cavity structure reflects said input optical signals at a 45 degree angle.

3. The optical cavity structure of claim 2, wherein the three dimensional high transmission cavity structure interconnects said first and second waveguides at 90 degrees.

4. The optical cavity structure of claim 3, wherein said three dimensional high transmission cavity structure is a five-sided polygon.

5. The optical cavity structure of claim 4, wherein the three dimensional high transmission cavity structure includes a fifth side that is aligned at an angles 135 degrees from both of its respective sides.

6. The optical cavity structure of claim 5, wherein said first waveguide and second waveguide are polySi waveguides.

7. The optical cavity structure of claim 5, wherein said first waveguide and second waveguide are SOI waveguides.

8. The optical cavity structure of claim 7, wherein said three dimensional high transmission cavity structure is etched using anisotropic etching.

9. An optical splitter device, comprising
   an input port for receiving input optical signals from an input waveguide; and
   a three dimensional splitting structure that receives said input optical signals and split said input optical signals into at least two separate signals that are directed to at least two output waveguides, said three dimensional splitting structure includes at least two separate optical cavities connected to their sides and comprising at least one two dimensional high transmission cavity bend structure and having materials that act to pull down a mode away from the outer wall, improving mode matching and reducing loss, wherein each of said optical cavities includes at least four straight edge sides that are orthogonal with a finite width and thickness.

10. The method of claim 9, wherein said three dimensional splitting structure is a T-shaped structure.

11. The optical splitter device of claim 10, wherein said first waveguide and said at least two output waveguides are polySi waveguides.

12. The optical splitter device of claim 10, said first waveguide and said at least two output waveguides are SOI waveguides.

13. The optical splitter device of claim 10, wherein said optical cavities are etched using anisotropic etching.

14. The optical splitter device of claim 10, wherein the SOI waveguides have a silicon core.

15. The optical splitter device of claim 14, wherein the SOI waveguides have cladding of silica and top cladding of air.

16. The optical splitter device of claim 13, wherein the polySi waveguides have a silicon core.

17. The optical splitter device of claim 16, wherein the polySi waveguides have cladding of silica and top cladding of air.

18. The optical splitter device of claim 10, wherein the three dimensional splitting structure is Y-shaped.

19. The optical splitter device of claim 18, wherein said at least two optical cavities form a seven sided polygon.

20. The optical splitter device of claim 19, wherein said seven sided polygon includes five straight edge sides that are orthogonal.

21. The optical splitter device of claim 20, wherein the seven sided polygon includes two sides that are aligned at angles of 135 degrees and 270 degrees with their respective adjacent sides.

22. The optical splitter device of claim 21, wherein said first waveguide and said at least two output waveguides are polySi waveguides.

23. The optical splitter device of claim 21, said first waveguide and said at least two output waveguides are SOI waveguides.

24. The optical splitter device of claim 21, wherein said optical cavities are etched using anisotropic etching.

25. The optical splitter device of claim 23, wherein the SOI waveguides have a silicon core.

26. The optical splitter device of claim 25, wherein the SOI waveguides have cladding of silica and top cladding of air.

27. The optical splitter device of claim 22, wherein the polySi waveguides have a silicon core.

28. The optical splitter device of claim 27, wherein the polySi waveguides have cladding of silica and top cladding of air.

29. An optical resonator, comprising:
a plurality of straight waveguides; and
a plurality of three dimensional high transmission cavity elements for interconnecting said plurality of straight waveguides to form said optical resonator and comprising at least one two dimensional high transmission cavity bend structure and having materials that act to pull down a mode away from the outer wall, improving mode matching and reducing loss, wherein said three dimensional interconnecting elements include at least four straight edges that are orthogonal and of a finite width and thickness.

30. The optical cavity structure of claim 29, wherein said three dimensional high transmission cavity elements are five-sided polygons.

31. The optical cavity structure of claim 30, wherein the five-sided polygons each include a fifth side that is aligned at an angles 135 degrees from both of its respective sides.

32. The optical cavity structure of claim 31, wherein said plurality of waveguides are polySi waveguides.

33. The optical cavity structure of claim 31, wherein said plurality of waveguides are SOI waveguides.

34. The optical cavity structure of claim 33, wherein said three dimensional high transmission cavity elements are etched using anisotropic etching.

* * * * *